(12) United States Patent
Chatterjee et al.

(10) Patent No.: US 12,323,802 B2
(45) Date of Patent: Jun. 3, 2025

(54) SYSTEMS AND METHODS FOR PROVIDING A SECURE NOTIFICATION SERVICE FOR MOBILE APPLICATIONS

(71) Applicant: Verizon Patent and Licensing Inc., Basking Ridge, NJ (US)

(72) Inventors: Sutap Chatterjee, Tampa, FL (US); Atul Sharma, Tampa, FL (US); Abhishek Joshi, Tampa, FL (US); Deepak David Sampath, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 442 days.

(21) Appl. No.: 17/807,965

(22) Filed: Jun. 21, 2022

(65) Prior Publication Data

US 2023/0413054 A1    Dec. 21, 2023

(51) Int. Cl.
*H04W 12/106* (2021.01)
*H04W 12/069* (2021.01)
*H04W 12/37* (2021.01)
*H04W 68/00* (2009.01)

(52) U.S. Cl.
CPC ....... *H04W 12/106* (2021.01); *H04W 12/069* (2021.01); *H04W 12/37* (2021.01); *H04W 68/005* (2013.01)

(58) Field of Classification Search
None
See application file for complete search history.

(56) References Cited

U.S. PATENT DOCUMENTS

2019/0230063 A1 * 7/2019 McCready ............ H04L 63/08
2021/0334355 A1 * 10/2021 Edwards ............ G06F 21/6218

* cited by examiner

*Primary Examiner* — Frantz Bataille

(57) ABSTRACT

A device may receive a notification message to be securely delivered to a recipient associated with a user device, and may validate the recipient. The device may generate a secure sanitized summary message, for the notification message, based on predefined templates or based on a natural language processing model, and may generate a token for the notification message. The device may store the notification message, the token, and entitlement information for the recipient in a data structure, and may provide, via an OTA infrastructure, the secure sanitized summary message and the token to the user device. The device may receive, from the user device, the token based on a selection of the secure sanitized summary message by the recipient, and may retrieve the notification message from the data structure based on the token. The device may provide the notification message to the user device associated with the recipient.

20 Claims, 12 Drawing Sheets

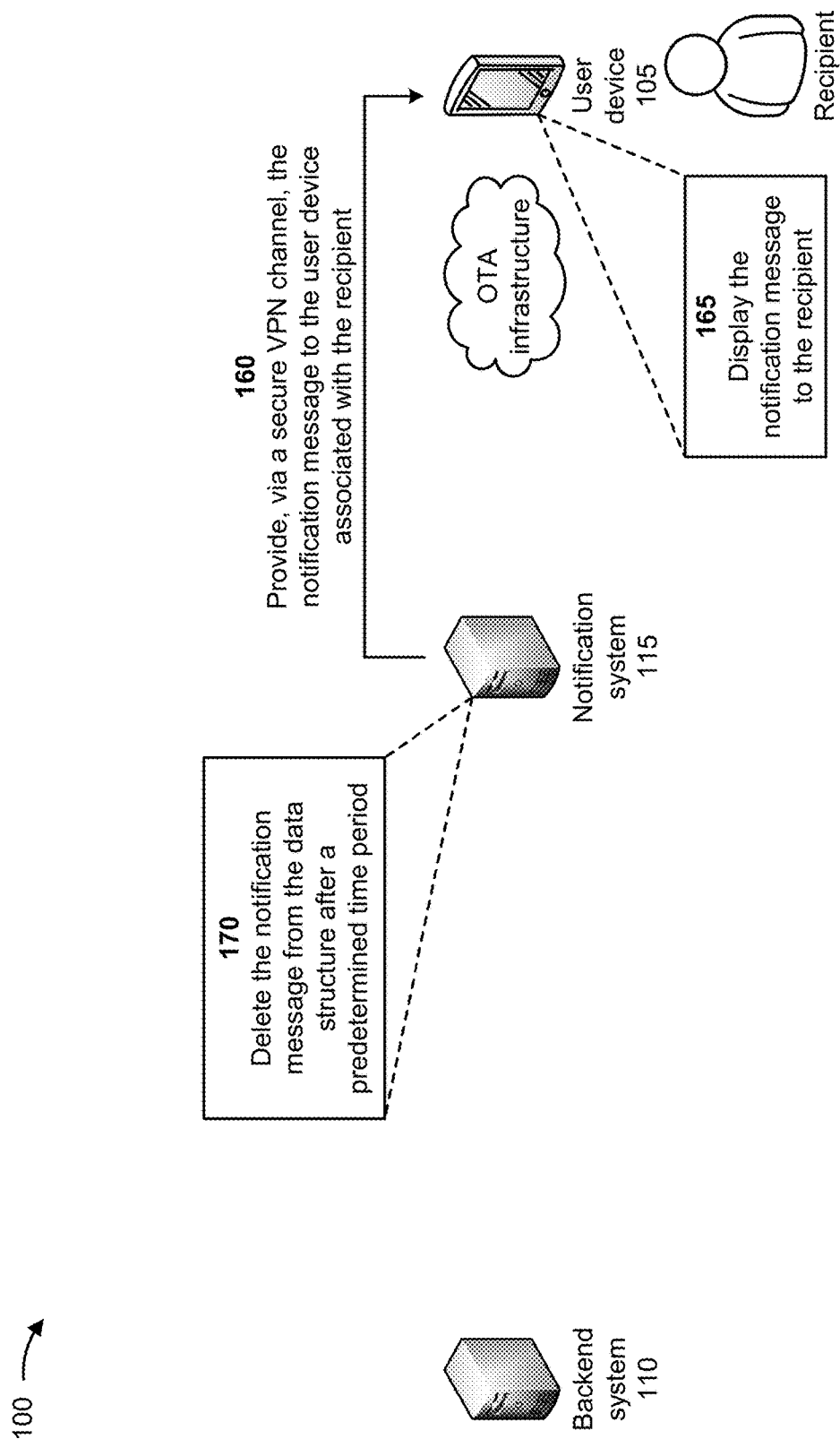

SYSTEMS AND METHODS FOR PROVIDING A SECURE NOTIFICATION SERVICE FOR MOBILE APPLICATIONS

BACKGROUND

Users of mobile applications executing on user devices (e.g., smartphones) may receive notifications associated with the mobile applications. The notifications may alert the users about various events that the users may have subscribed to (e.g., explicitly or implicitly) by installing the mobile applications on the user devices.

BRIEF DESCRIPTION OF THE DRAWINGS

FIGS. 1A-1I are diagrams of an example associated with providing a secure notification service for mobile applications.

DETAILED DESCRIPTION OF EXAMPLE EMBODIMENTS

Figure 1A:
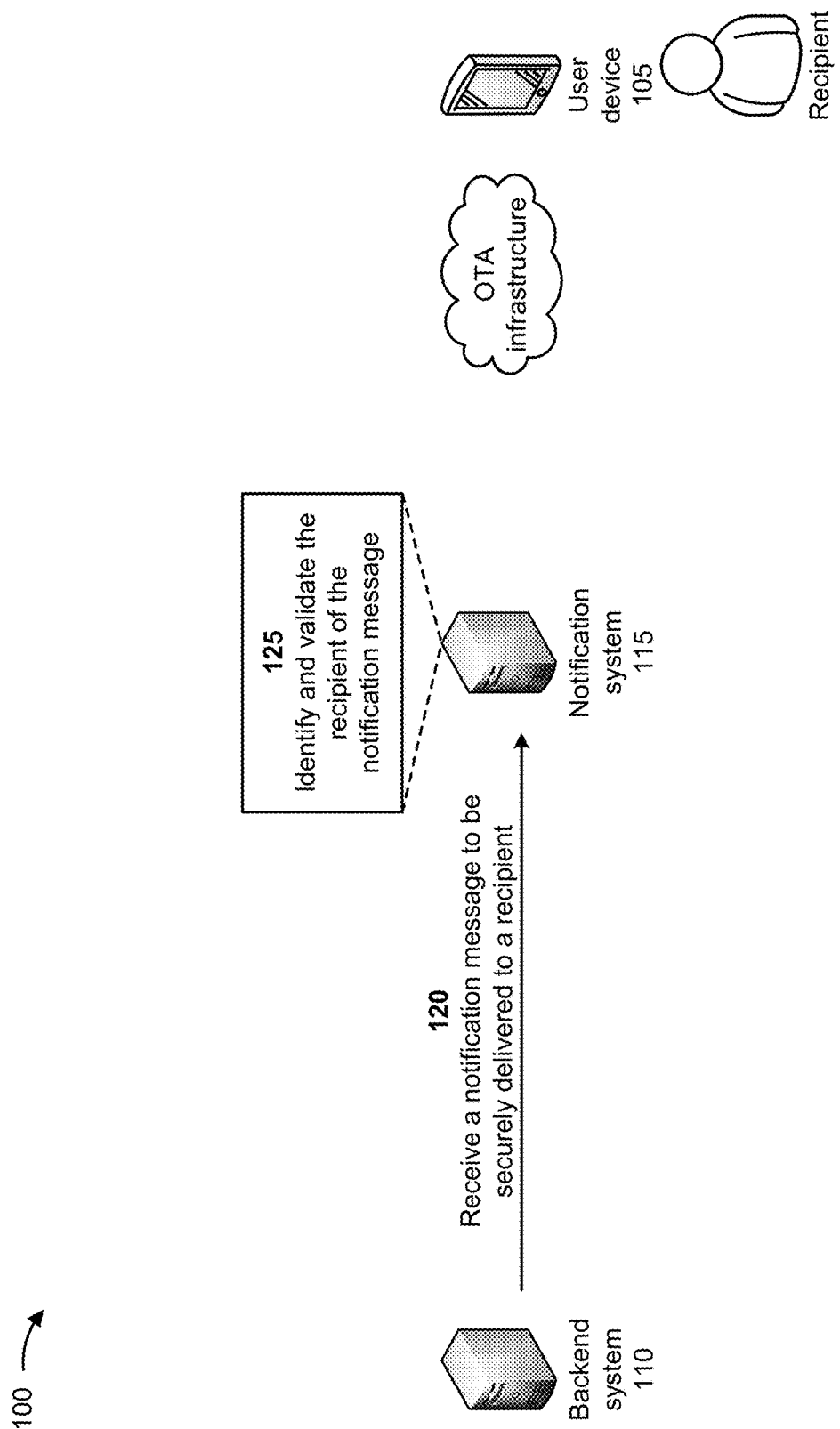

The following detailed description of example implementations refers to the accompanying drawings. The same reference numbers in different drawings may identify the same or similar elements.

A notification may be delivered as a text message that can be viewed even when a user device is not being actively used by the user. A notification may also be delivered with a distinctive audio ringtone or a vibration alert. Typically, a notification is delivered from a backend system to the mobile application on the user device via an over-the-air (OTA) delivery infrastructure. Providers of user device operating systems (e.g., the Android mobile operating system, the iOS operating system, and/or the like) may maintain the OTA infrastructure that is used by mobile application providers for delivering notifications. However, the OTA infrastructure is not private and is ill-suited for delivering notifications that contain confidential information. Operations and business support applications, provided on user devices, may access and handle confidential information in a secure manner. Unfortunately, the risks of conveying confidential information via notifications sent through the OTA infrastructure severely restricts use of such applications. Thus, current techniques for providing notifications via an OTA infrastructure consume computing resources (e.g., processing resources, memory resources, communication resources, and/or the like), networking resources, and/or other resources associated with failing to provide useful notifications associated with a mobile application, experiencing theft of confidential information provided via notifications associated with the mobile application, identifying the theft of the confidential information, and/or the like.

Some implementations described herein provide a notification system that provides a secure notification service for mobile applications. For example, the notification system may receive a notification message to be securely delivered to a recipient associated with a user device, and may validate the recipient. The notification system may generate a secure sanitized summary message, for the notification message, based on predefined templates or based on a natural language processing model, and may generate a token for the notification message. The notification system may store the notification message, the token, and entitlement information for the recipient in a data structure, and may provide, via an OTA infrastructure, the secure sanitized summary message and the token to the user device. The notification system may receive, from the user device, the token based on a selection of the secure sanitized summary message by the recipient, and may retrieve the notification message from the data structure based on the token. The notification system may provide, via a secure virtual private network (VPN) channel, the notification message to the user device associated with the recipient.

In this way, the notification system provides a secure notification service for mobile applications. For example, the notification system may provide notifications, with confidential information, to mobile applications in a secure manner, and may maintain the privacy, confidentiality, and integrity of the notifications. A mobile device manager may create a secure working container on a user device that is executing the mobile applications. The mobile applications executing in the secure working container may communicate with a backend system over a secure virtual private network (VPN) channel. The notification system may enable the backend system to securely provide the notifications, with the confidential information, to mobile applications of the user device. Thus, the notification system may conserve computing resources, networking resources, and/or other resources that would have otherwise been consumed by failing to provide useful notifications associated with a mobile application, experiencing theft of confidential information provided via notifications associated with the mobile application, identifying the theft of the confidential information, and/or the like.

FIGS. 1A-1I are diagrams of an example 100 associated with providing a secure notification service for mobile applications. As shown in FIGS. 1A-1I, example 100 includes a user device 105, an OTA infrastructure, and a backend system 110 associated with a notification system 115. The OTA infrastructure may include an infrastructure (e.g., radio access networks (RANs), servers, and/or the like) that provides for transmission and reception of application-related information (e.g., notifications) in a wireless communications system. The OTA infrastructure may be utilized with a short messaging service (SMS) to enable transfer of small text files even while using a user device (e.g., a mobile device) for other purposes. In addition to short messages and small graphics, such files may include instructions for subscription activation, banking transactions, ringtones, wireless access protocol (WAP) settings, and/or the like. Further details of the user device 105, the OTA infrastructure, the backend system 110, and the notification system 115 are provided elsewhere herein.

As shown in FIG. 1A, and by reference number 120, the notification system 115 may receive a notification message to be securely delivered to a recipient associated with the user device 105. For example, the user device 105 may utilize an application (e.g., a mobile application) that requires security for notification messages associated with the application. The backend system 110 may generate the notification message (e.g., associated with the application) to be securely delivered to the recipient associated with the user device 105, and may provide the notification message to the notification system 115. The notification system 115 may receive the notification message from the backend system 110 (e.g., a client of the notification system 115). In some implementations, the notification message may include confidential information that is to be securely delivered to the recipient.

Although implementations described herein relate to a notification message intended for a single recipient, in some implementations the notification message may be intended for multiple recipients. In such implementations, the notification system 115 may generate additional notification messages (e.g., with the same content as the notification message) for each of the multiple recipients and may perform the functionality described herein for each of the additional notification messages.

As further shown in FIG. 1A, and by reference number 125, the notification system 115 may identify and validate the recipient of the notification message. For example, the notification system 115 may receive (e.g., from an external identity service) credentials identifying recipients based on names, usernames, passwords, passcodes, identifiers of user devices 105 associated with the recipients, and/or the like. The notification system 115 may receive (e.g., from the backend system 110 and with the notification message) a credential of the recipient associated with the user device 105. The notification system 115 may identify the recipient based on comparing the credential of the recipient with the credentials received from the external identity service. The notification system 115 may not provide the notification message to the recipient if the notification system 115 fails to identify the recipient.

To receive a notification message, the recipient needs to be entitled to the notification message (e.g., validated to receive the notification message). The notification system 115 may receive, from the external identity service, entitlement information identifying a minimum entitlement that recipients must have to receive the notification message from the backend system 110. The external identity service may manage entitlement levels of recipients associated with user devices 105. The notification system 115 may validate that the recipient has the necessary entitlement to receive the notification message, and may not provide the notification message to the recipient when the notification system 115 fails to validate the recipient.

Figure 1B:
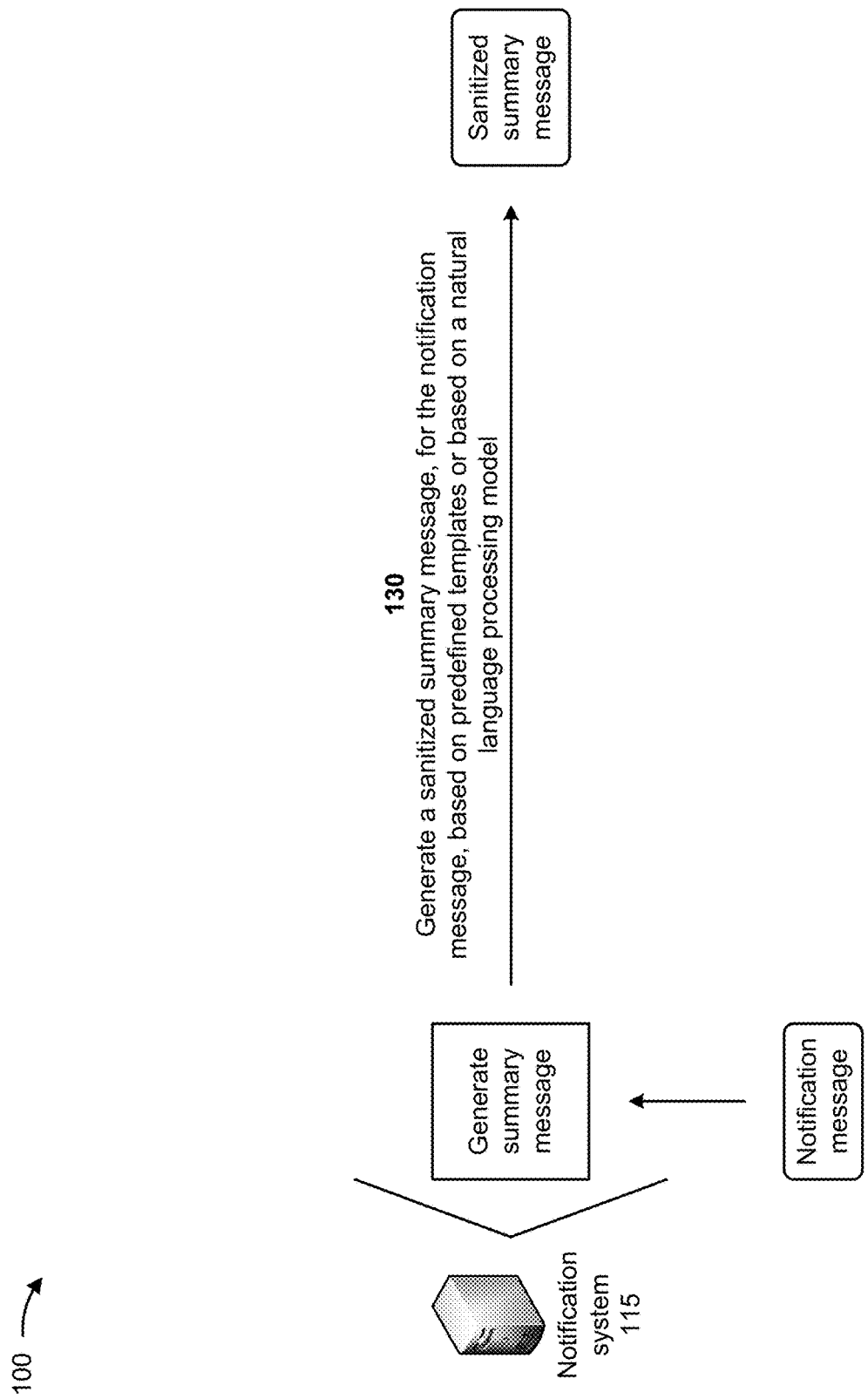

As shown in FIG. 1B, and by reference number 130, the notification system 115 may generate a secure sanitized summary message, for the notification message, based on predefined templates or based on a natural language processing (NLP) model. For example, when the notification system 115 identifies and validates the recipient, the notification system 115 may generate the secure sanitized summary message for the notification message. The secure sanitized summary message may omit the confidential information included in the notification message. In some implementations, the notification system 115 may generate the secure sanitized summary message based on the predefined templates by analyzing the notification message, and selecting a predefined template, from a plurality of predefined templates (e.g., that are sanitized and stored in a data structure associated with the notification system 115), based on analyzing the notification message. The notification system 115 may utilize the predefined template and the notification message to generate the secure sanitized summary message, and may validate that the secure sanitized summary message does not include confidential information from the notification message. For example, the predefined template may include information, such as "a task has been assigned to you on {date}." Based on this template, the notification system 115 may generate a secure sanitized summary message, such as "a task has been assigned to you on 2022-03-06 16:00." The notification message associated with the secure sanitized summary message may include additional information, such as "task ICDE456 associated with Order Number 223456 has been assigned to you and scheduled for completion by 2022-03-10."

In some implementations, the notification system 115 may generate the secure sanitized summary message, for the notification message, based on the NLP model by processing the notification message, with the NLP model, to identify and remove confidential information from the notification message and to generate the secure sanitized summary message. Alternatively, or additionally, the notification system 115 may process the notification message, with the NLP model, to select a predefined template from a plurality of predefined templates and to utilize the predefined template and the notification message to generate the secure sanitized summary message. The NLP model may apply a set of rules to the notification message, such as, for example, rules that mask out all proper nouns (e.g., non-dictionary noun phrases), rules that mask out all number sequences other than sequences that resemble a date or a time, rules that identify and utilize commonly used verbs and phrases to identify the predefined template for the secure sanitized summary message, and/or the like. For example, for a notification message, such as "task ICDE456 associated with Order Number 223456 has been assigned to you and scheduled for completion by 2022-03-10," the NLP model may identify that the notification message relates to a task assignment, based on the presence of the words "task" and "assigned." The NLP model may identify an intent of the notification message based on the word "associated." Based on this analysis, the NLP model may select a task assignment sanitized summary message template that includes information, such as "a task has been assigned to you on 2022-03-06 16:00."

Figure 1C:
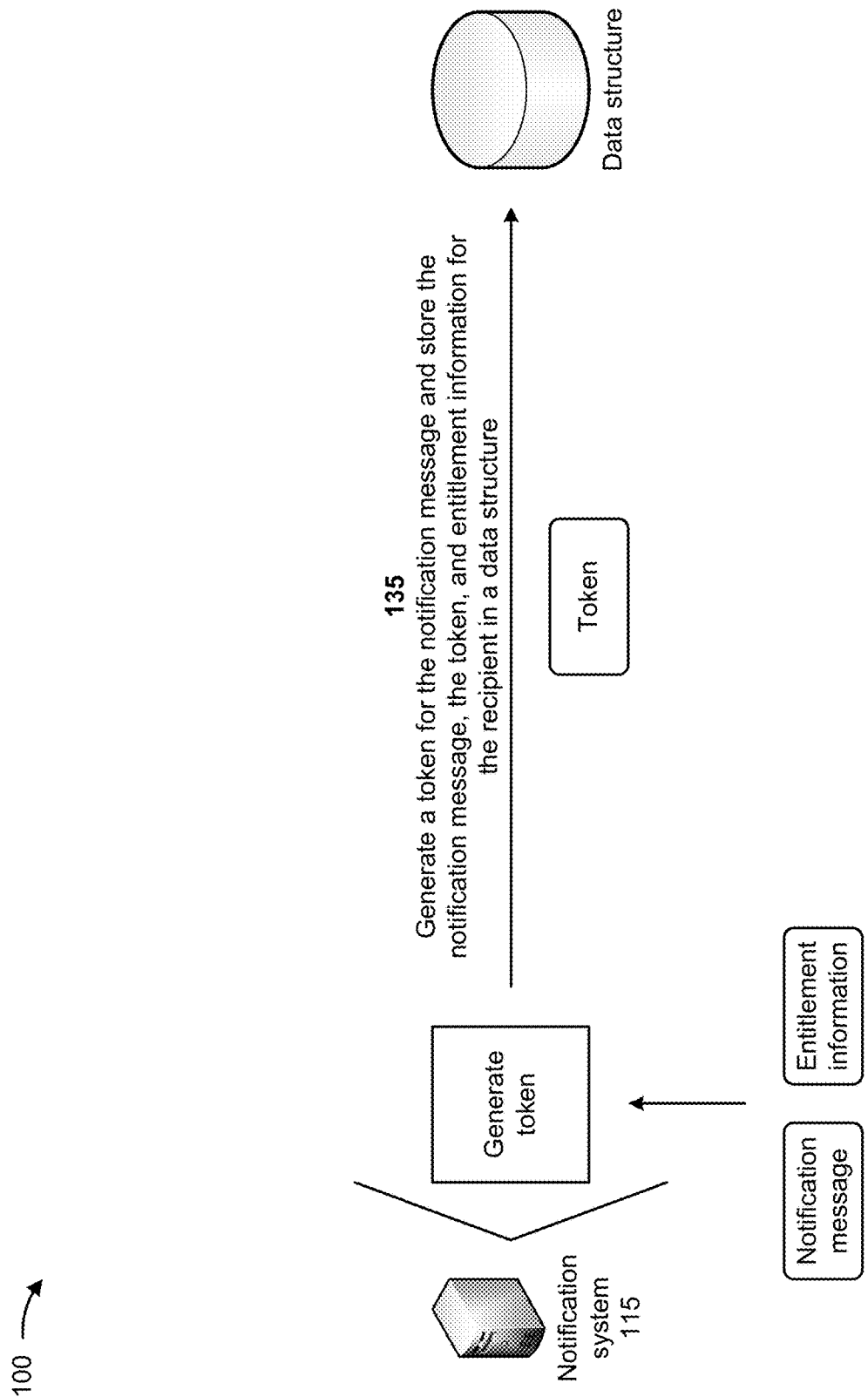

As shown in FIG. 1C, and by reference number 135, the notification system 115 may generate a token for the notification message and may store the notification message, the token, and entitlement information for the recipient in a data structure (e.g., a database, a table, a list, and/or the like). For example, the notification system 115 may generate a unique token for the notification message and the recipient. The token may be utilized by the recipient to securely retrieve the notification message. In some implementations, the notification system 115 may generate, as the token, an MD5 hash of the notification message, data identifying the recipient, and a variable length random byte string (e.g., referred to as a "salt"). In this way, the notification system 115 may ensure that the token is unique and cannot be easily duplicated or guessed. In some implementations, the notification system 115 may store the notification message, the token, and the entitlement information associated with the notification message in the data structure (e.g., a notification store) associated with the notification system 115. The data structure may associate the notification message, the token, and the entitlement information so that the notification system 115 may retrieve the notification message at a later time and based on the token.

Figure 1D:
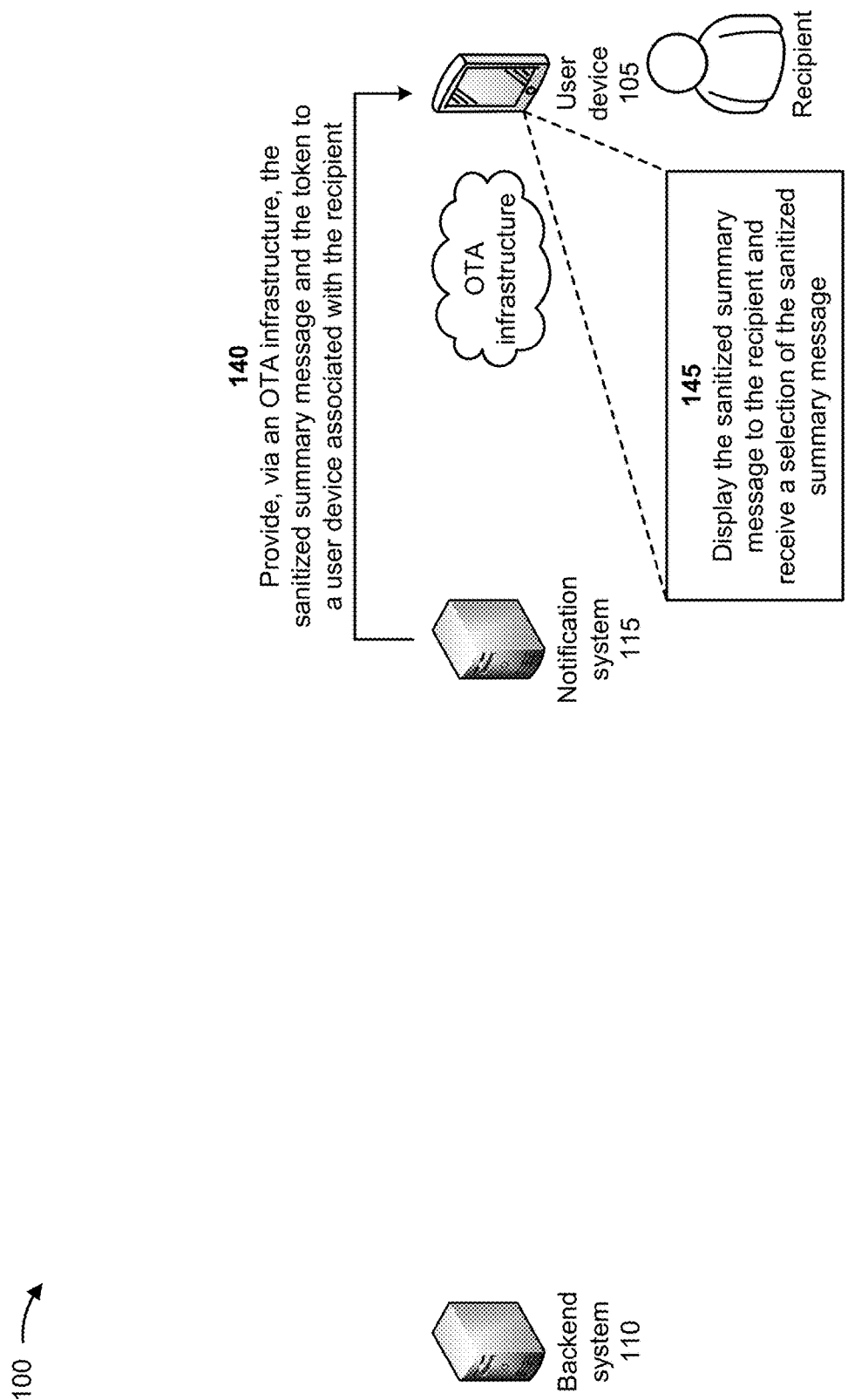

As shown in FIG. 1D, and by reference number 140, the notification system 115 may provide, via the OTA infrastructure, the secure sanitized summary message and the token to the user device 105 associated with the recipient. For example, the notification system 115 may append the token to the secure sanitized summary message, and may provide the secure sanitized summary message, with the appended token, to the OTA infrastructure. The OTA infrastructure may provide the secure sanitized summary message and the token to the user device 105 associated with the recipient. The user device 105 may receive the secure sanitized summary message and the token from the OTA infrastructure.

As further shown in FIG. 1D, and by reference number 145, the user device 105 may display the secure sanitized summary message to the recipient and may receive a selection of the secure sanitized summary message by the recipient. For example, the user device 105 may store the token in a data structure associated with the user device 105 and may display the secure sanitized summary message to the recipient. The recipient may utilize the user device 105 to select the secure sanitized summary message (e.g., via touchscreen input, a keyboard input, and/or the like), and the user device 105 may receive the selection of the secure sanitized summary message by the recipient.

Figure 1E:
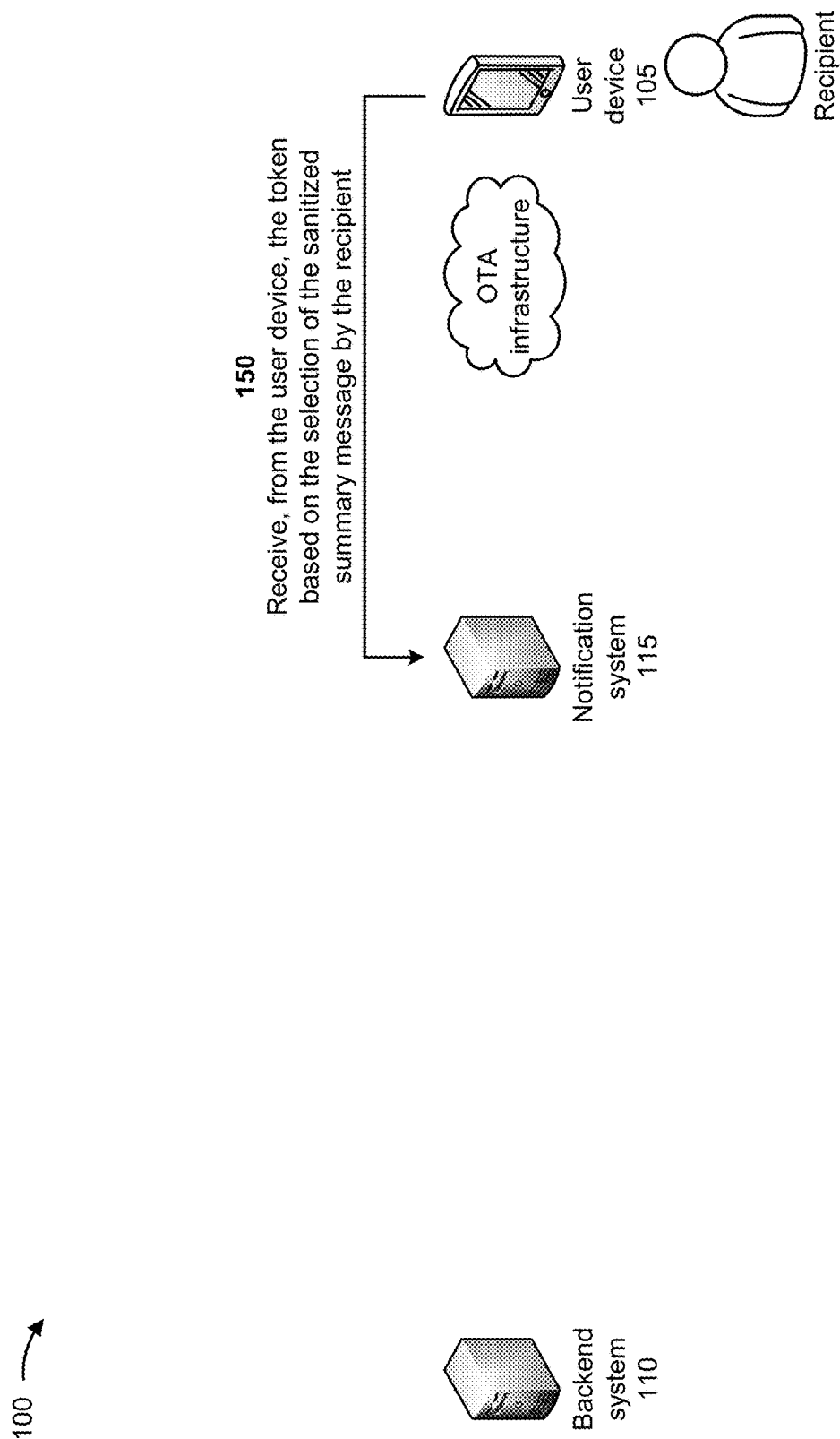

As shown in FIG. 1E, and by reference number 150, the notification system 115 may receive, from the user device 105, the token based on the selection of the secure sanitized summary message by the recipient. For example, when the recipient selects the secure sanitized summary message, the selection of the secure sanitized summary message may cause the user device 105 to retrieve the token from the data structure associated with the user device 105, and to provide the token to the notification system 115, via the OTA infrastructure. The notification system 115 may receive the token from the OTA infrastructure.

Figure 1F:
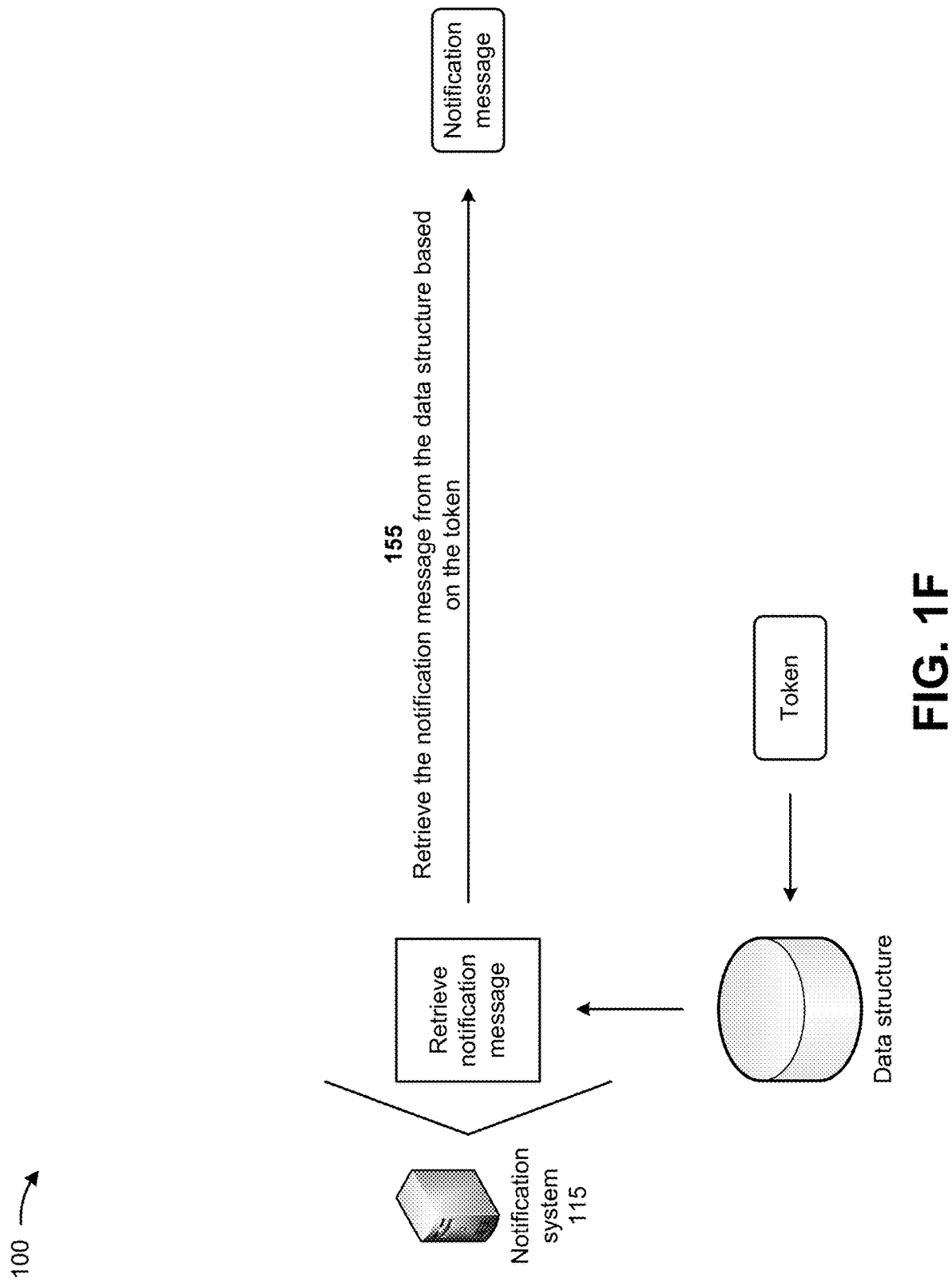

As shown in FIG. 1F, and by reference number 155, the notification system 115 may retrieve the notification message from the data structure based on the token. For example, the notification system 115 may utilize the association of the token with the notification message (e.g., in the data structure) to identify and retrieve the notification message from the data structure based on the token. In some implementations, the notification system 115 may provide, to the data structure, the token and a request for the notification message associated with the token. The data structure may retrieve the notification message based on the token and the request, and may provide the notification message to the notification system 115.

As shown in FIG. 1G, and by reference number 160, the notification system 115 may provide, via a secure virtual private network (VPN) channel, the notification message to the user device 105 associated with the recipient. For example, the user device 105 may include a secure notification client, and the notification system 115 may provide, via the secure VPN channel (e.g., established over a cellular network or a Wi-Fi network), the notification message to the secure notification client executing on the user device 105. The secure notification client may be a shared client module that is part of a mobile application of the user device 105. The secure notification client may be responsible for securely retrieving notification messages from the notification system 115. The secure notification client may communicate with the backend system 110 over a secure link, such as a secure VPN channel or an encrypted connection. In some implementations, the secure notification client executing on the user device 105 may provide the token and the credentials of the recipient to the notification system 115. The notification system 115 may validate that the recipient is entitled to receive the notification message based on the token and the credentials. If the recipient is entitled to receive the notification message, the notification system 115 may securely provide, via the secure VPN channel, the notification message to the secure notification client executing on the user device 105.

As further shown in FIG. 1G, and by reference number 165, the user device 105 may display the notification message to the recipient. For example, the user device 105 may receive the notification message from the notification system 115 and via the secure VPN channel. The user device 105 may display the notification message to the recipient associated with the user device 105, and the recipient may review and/or act on the notification. In some implementations, the notification message may request that the recipient accept an update to the mobile application or a reinstallation of the mobile application. The recipient may accept the update or the reinstallation and the backend system 110 may update or reinstall the mobile application on the user device 105.

As further shown in FIG. 1G, and by reference number 170, the notification system 115 may delete the notification message from the data structure after a predetermined time period. For example, the notification message may include a lifecycle with three states. A create state may include a state when the notification message is received and stored in the data structure associated with the notification system 115. A delivered state may include a state when the notification message is securely delivered to the secure notification client executing on the user device 105. A deleted state may include a state when the notification message is deleted from the data structure and can no longer be accessed by the notification system 115. In some implementations, the notification system 115 may delete a notification message a predetermined time (e.g., one day, one week, and/or the like) after the notification message is stored in the data structure.

In some implementations, the notification system 115 may communicate with an external audit collector that gathers audit information for all notification messages that are delivered by the notification system 115. In some implementations, the notification system 115 may include authorization modules that ensure that external systems that access services of the notification system 115 are duly authorized. The authorization modules may perform authorizations via tokens generated using standard open ID authorization flows. In some implementations, the functionality of the notification system 115 may be extended to notification messages provided to desktop web applications executing on browsers that utilize the OTA infrastructure to deliver notifications.

Figure 1H:
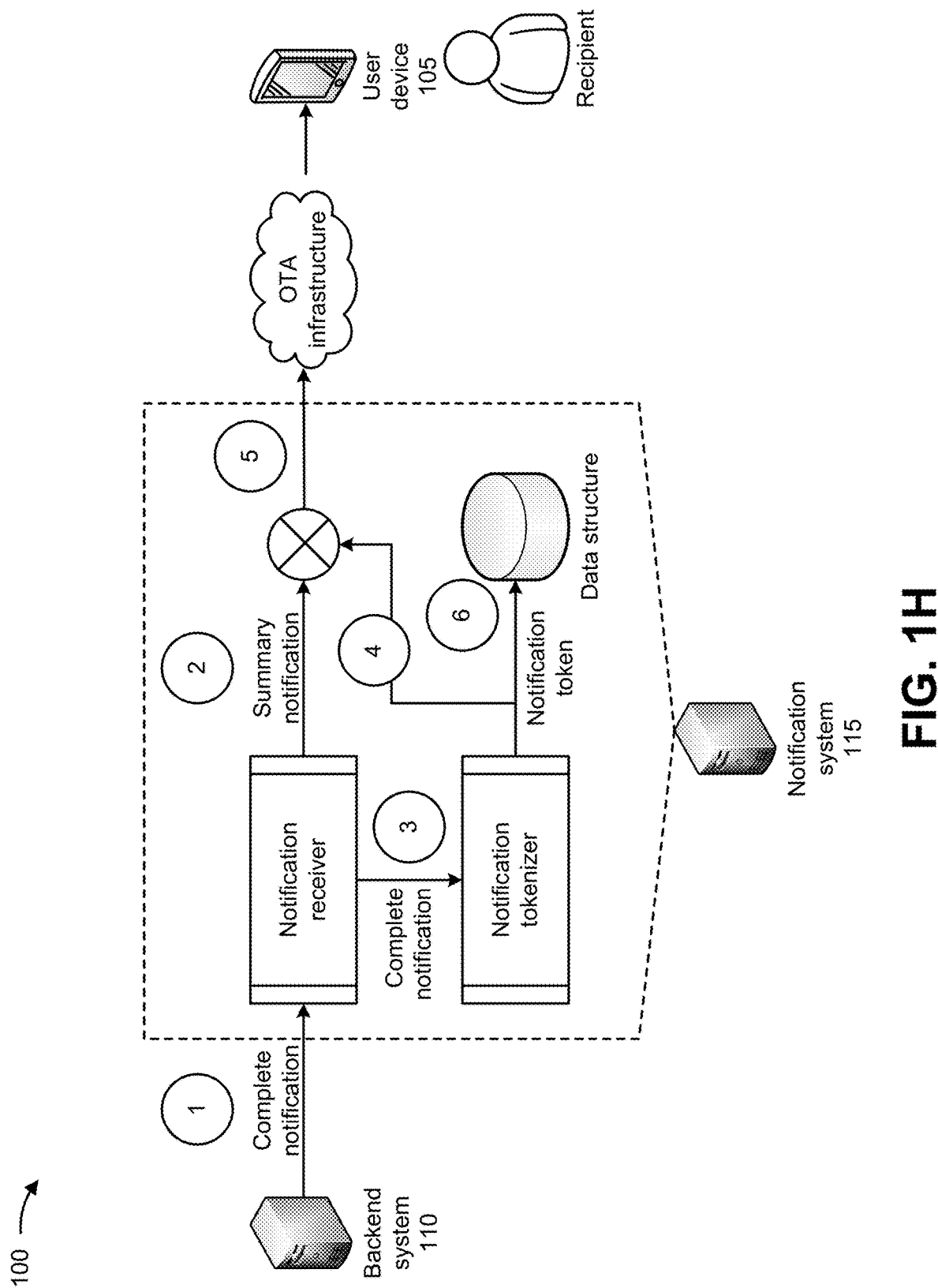

FIG. 1H depicts operations for preparing a notification message for secure delivery to the user device 105. As shown, the notification system 115 may include a notification receiver component, a notification tokenizer component, and the data structure. As shown at step 1 of FIG. 1H, when the backend system 110 has a notification message to be provided to the user device 105, the backend system 110 may post the notification message to the notification receiver component of the notification system 115. As shown at step 2, the notification receiver component may prepare a summary notification message based on the notification message. As shown at step 3, the notification receiver component may forward the notification message to the notification tokenizer component. As shown at step 4, the notification tokenizer may generate a token for the notification message. As shown at step 5, the token generated in step 4 may be appended to the summary notification message generated in step 2, and may be provided to the OTA infrastructure for delivery to the user device 105. As shown at step 6 of FIG. 1H, the notification message, along with the generated token, may be stored in the data structure.

Figure 1I:
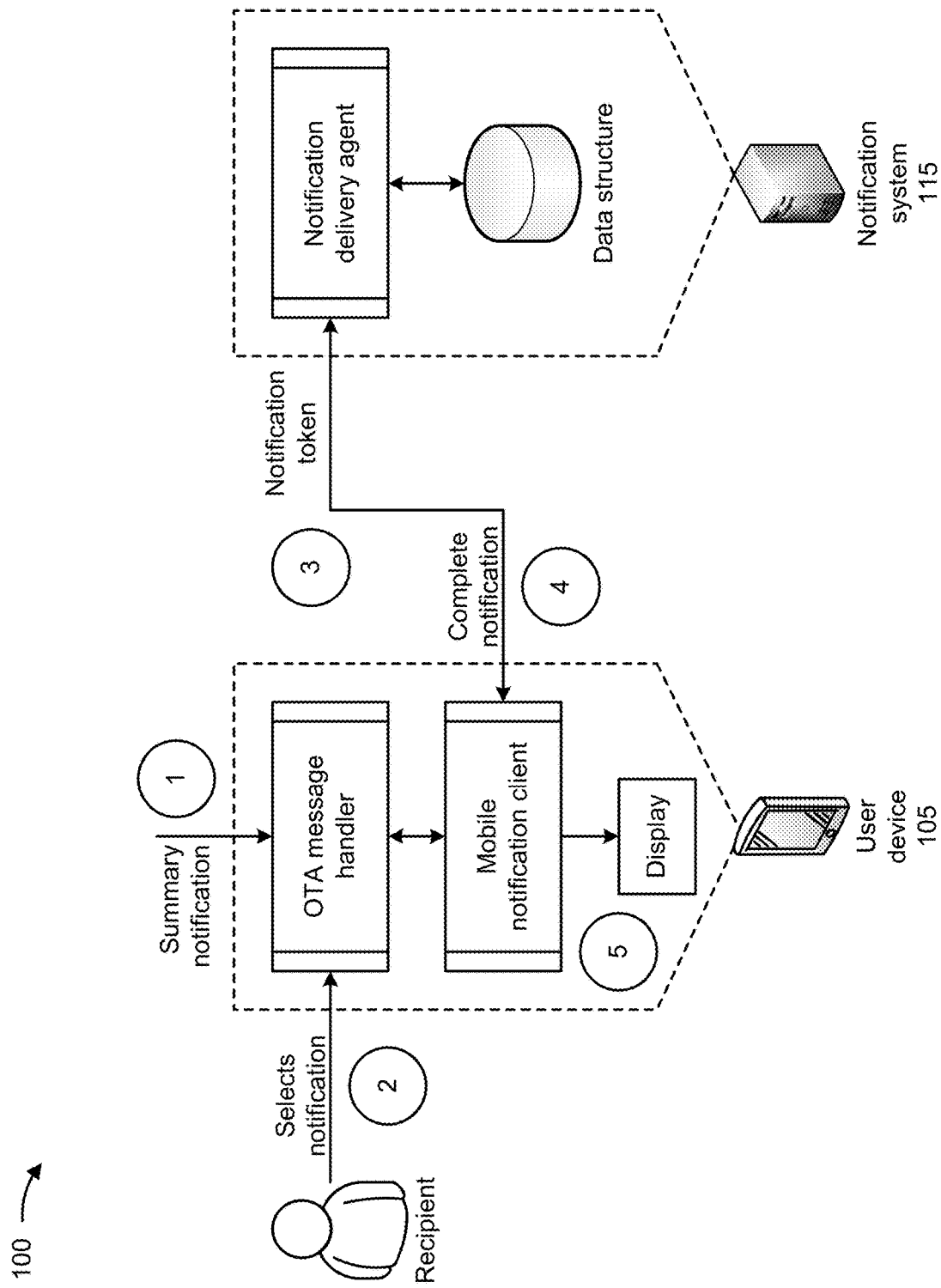

FIG. 1I depicts operations for securely receiving the notification message by the user device 105. As shown, the user device 105 may include an OTA message handler component, a mobile notification client component, and a display component, and the notification system 115 may include a notification delivery agent component. As shown at step 1 of FIG. 1I, the summary notification message and the token that was sent via the OTA infrastructure in step 5 of FIG. 1H may be received by the OTA message handler component (e.g., a component of a mobile operating system of the user device 105). As shown at step 2, the mobile operating system may display (e.g., via the display component) the summary notification message to the recipient, and the recipient may select the summary notification message. As shown at step 3, when the summary notification message is selected, the OTA message handler component may invoke the mobile notification client component to provide the token to the notification delivery agent component of the notification system 115 over a secure link. As shown at step 4, the notification delivery agent component may retrieve the notification message from the data structure and may provide the notification message to the mobile notification client component over the secure link. As shown at step 5 of FIG. 1I, the mobile notification client component may provide the notification message to the display component, and the display component may display the notification message to the recipient.

In this way, the notification system 115 provides a secure notification service for mobile applications. For example, the notification system 115 may provide notifications, with confidential information, to mobile applications in a secure manner, and may maintain the privacy, confidentiality, and integrity of the notifications. A mobile device manager may create a secure working container on the user device 105 that is executing the mobile applications. The mobile applications executing in the secure working container may communicate with the backend system 110 over a secure VPN channel. The notification system 115 may enable the backend system 110 to securely provide the notifications, with the confidential information, to mobile applications of the user device 105. Thus, the notification system 115 may conserve computing resources, networking resources, and/or other resources that would have otherwise been consumed by failing to provide useful notifications associated with a mobile application, experiencing theft of confidential information provided via notifications associated with the mobile application, identifying the theft of the confidential information, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
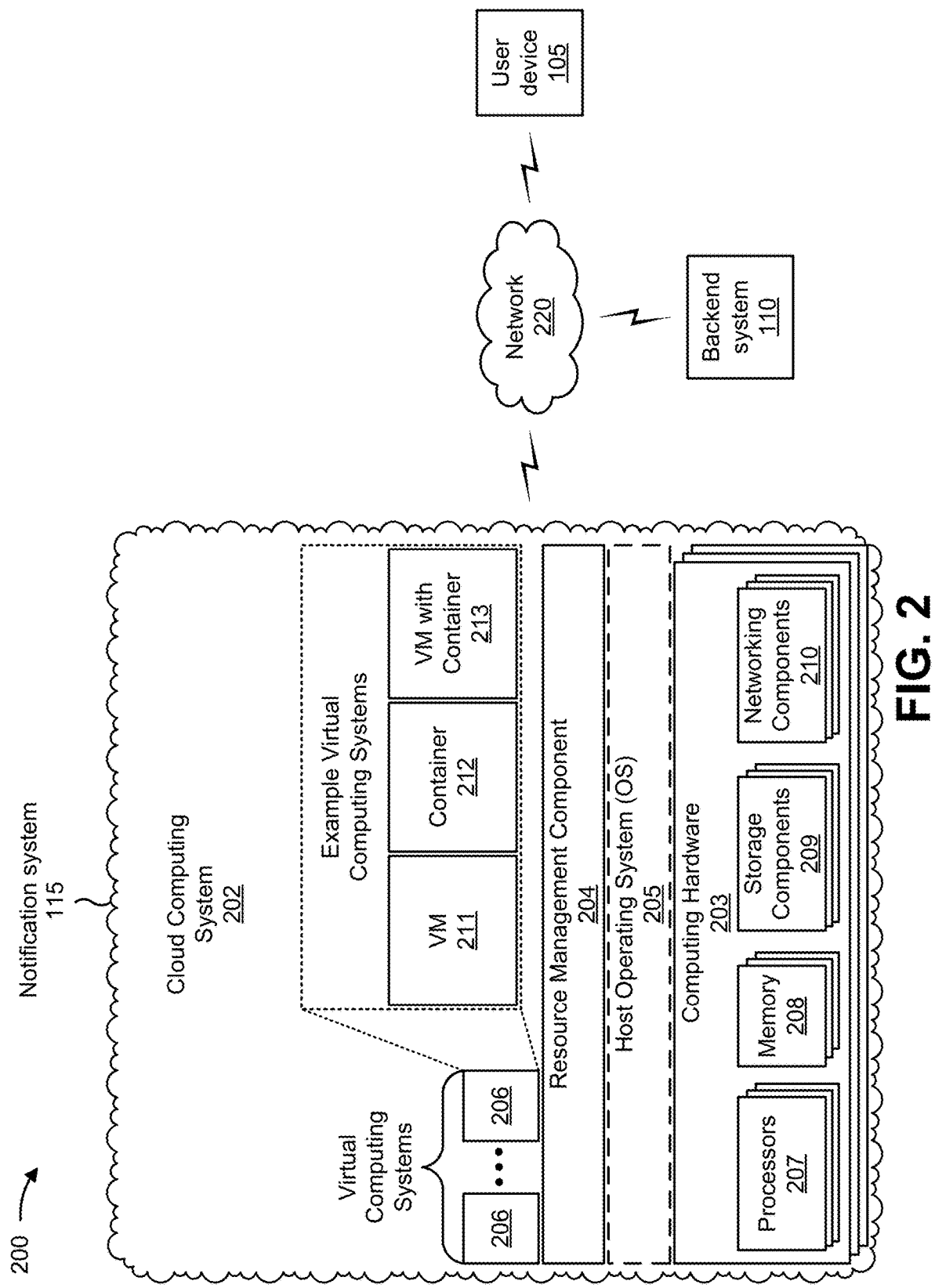
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the notification system 115, which may include one or more elements of and/or may execute within a cloud computing system 202. The cloud computing system 202 may include one or more elements 203-213, as described in more detail below. As further shown in FIG. 2, the environment 200 may include the user device 105, the backend system 110, and/or a network 220. Devices and/or elements of the environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The backend system 110 includes one or more devices capable of receiving, generating, storing, processing, providing, and/or routing information, as described elsewhere herein. The backend system 110 may include a communication device and/or a computing device. For example, the backend system 110 may include a server, such as an application server, a client server, a web server, a database server, a host server, a proxy server, a virtual server (e.g., executing on computing hardware), or a server in a cloud computing system. In some implementations, the backend system 110 includes computing hardware used in a cloud computing environment.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the notification system 115 may include one or more elements 203-213 of the cloud computing system 202, may execute within the cloud computing system 202, and/or may be hosted within the cloud computing system 202, in some implementations, the notification system 115 may not be cloud-based (e.g., may be implemented outside of a cloud computing system) or may be partially cloud-based. For example, the notification system 115 may include one or more devices that are not part of the cloud computing system 202, such as the device 300 of FIG. 3, which may include a standalone server or another type of computing device. The notification system 115 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
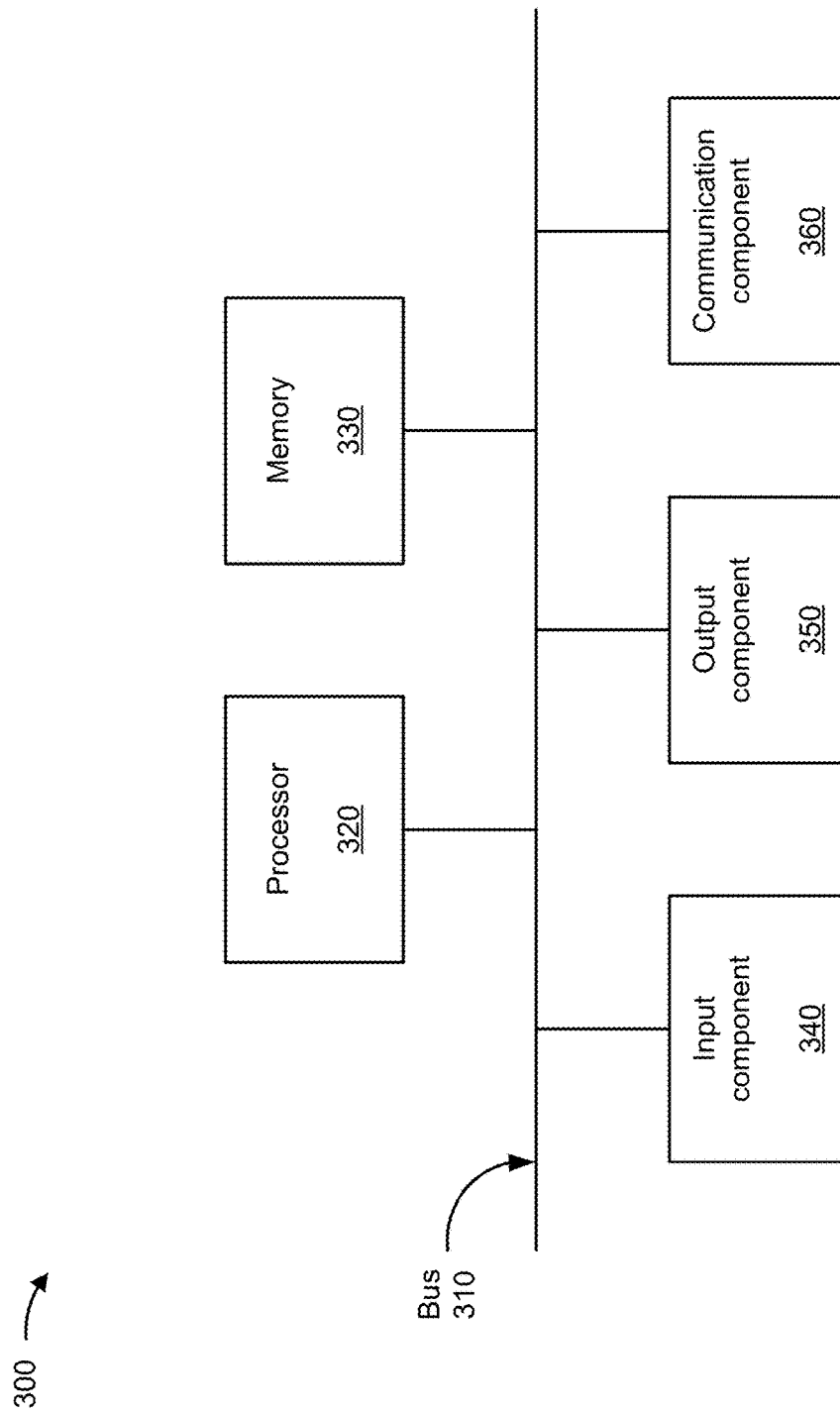
FIG. 3 is a diagram of example components of one or more devices of FIG. 2.

FIG. 3 is a diagram of example components of a device 300, which may correspond to the user device 105, the backend system 110, and/or the notification system 115. In some implementations, the user device 105, the backend system 110, and/or the notification system 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
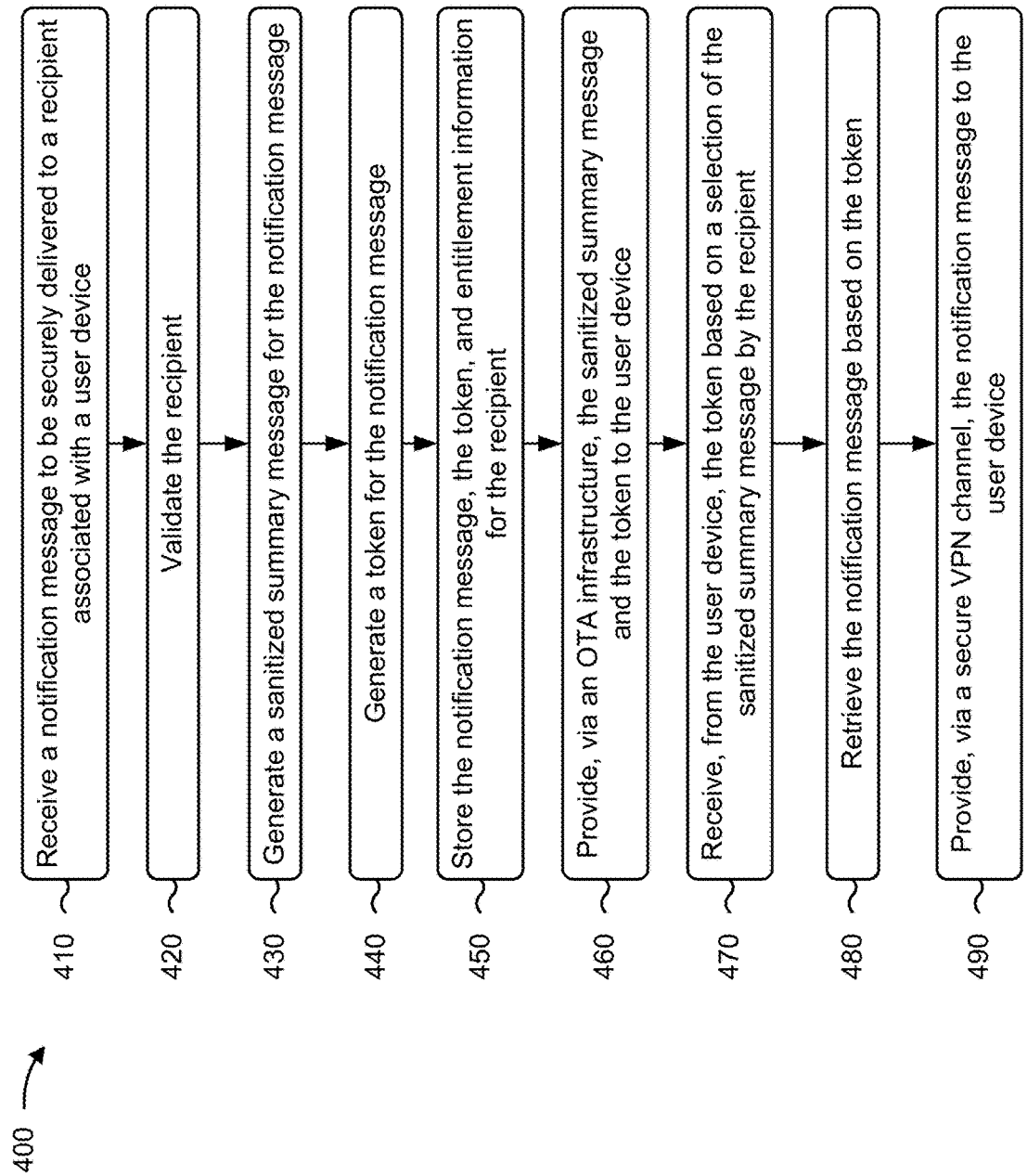
FIG. 4 depicts a flowchart of an example process for providing a secure notification service for mobile applications.

FIG. 4 depicts a flowchart of an example process 400 for providing a secure notification service for mobile applications. In some implementations, one or more process blocks of FIG. 4 may be performed by a device (e.g., the notification system 115). In some implementations, one or more process blocks of FIG. 4 may be performed by another device or a group of devices separate from or including the device, such as a user device (e.g., the user device 105) and/or a backend system (e.g., the backend system 110). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a notification message to be securely delivered to a recipient associated with a user device (block 410). For example, the device may receive a notification message to be securely delivered to a recipient associated with a user device, as described above. In some implementations, receiving the notification message to be securely delivered to the recipient associated with the user device includes receiving the notification message from a backend system that supports a mobile application provided on the user device.

As further shown in FIG. 4, process 400 may include validating the recipient (block 420). For example, the device may validate the recipient, as described above. In some implementations, validating the recipient includes receiving the entitlement information for the recipient from an identity service, and validating that the recipient is entitled to receive the notification message based on the entitlement information.

As further shown in FIG. 4, process 400 may include generating a secure sanitized summary message for the notification message (block 430). For example, the device may generate a secure sanitized summary message, for the notification message, based on predefined templates or based on a natural language processing model, as described above. In some implementations, generating the secure sanitized summary message, for the notification message, based on the predefined templates includes analyzing the notification message, selecting a predefined template, from a plurality of predefined templates, based on analyzing the notification message, and utilizing the predefined template and the notification message to generate the secure sanitized summary message.

In some implementations, generating the secure sanitized summary message, for the notification message, based on the natural language processing model includes processing the notification message, with the natural language processing model, to identify and remove confidential information from the notification message and to generate the secure sanitized summary message. In some implementations, generating the secure sanitized summary message, for the notification message, based on the natural language processing model includes processing the notification message, with the natural language processing model, to select a predefined template from a plurality of predefined templates and to utilize the predefined template and the notification message to generate the secure sanitized summary message.

As further shown in FIG. 4, process 400 may include generating a token for the notification message (block 440). For example, the device may generate a token for the notification message, as described above. In some implementations, generating the token for the notification message includes generating the token based on a hash of the notification message, identity data associated with the recipient, and a variable length random byte string.

As further shown in FIG. 4, process 400 may include storing the notification message, the token, and entitlement information for the recipient (block 450). For example, the device may store the notification message, the token, and entitlement information for the recipient in a data structure, as described above.

As further shown in FIG. 4, process 400 may include providing, via an OTA infrastructure, the secure sanitized summary message and the token to the user device (block 460). For example, the device may provide, via an OTA infrastructure, the secure sanitized summary message and the token to the user device, as described above.

As further shown in FIG. 4, process 400 may include receiving, from the user device, the token based on a selection of the secure sanitized summary message by the recipient (block 470). For example, the device may receive, from the user device, the token based on a selection of the secure sanitized summary message by the recipient, as described above. In some implementations, the user device is configured to display the secure sanitized summary message to the recipient and to receive the selection of the secure sanitized summary message by the recipient. In some implementations, receiving the token based on the selection of the secure sanitized summary message by the recipient includes receiving the token and credentials of the recipient based on the selection of the secure sanitized summary message by the recipient.

As further shown in FIG. 4, process 400 may include retrieving the notification message based on the token (block 480). For example, the device may retrieve the notification message from the data structure based on the token, as described above. In some implementations, retrieving the notification message from the data structure based on the token includes validating that the recipient is entitled to receive the notification message based on the token and the credentials of the recipient, and retrieving the notification message from the data structure based on validating that the recipient is entitled to receive the notification message.

As further shown in FIG. 4, process 400 may include providing, via a secure VPN channel, the notification message to the user device (block 490). For example, the device may provide, via a secure VPN channel, the notification message to the user device associated with the recipient, as described above. In some implementations, the user device is configured to display the notification message to the recipient.

In some implementations, process 400 includes validating that the secure sanitized summary message does not include confidential information from the notification message. In some implementations, process 400 includes deleting the notification message from the data structure after a predetermined time period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a notification message comprising confidential information, the notification message to be securely delivered to a recipient associated with a user device;
   validating, by the device, the recipient;
   generating, by the device, a secure sanitized summary message, for the notification message, based on predefined templates or based on a natural language processing model, wherein the secure sanitized summary message omits the confidential information;
   generating, by the device, a token for the notification message;
   storing, by the device, the notification message, the token, and entitlement information for the recipient in a data structure;
   providing, by the device and via an over-the-air (OTA) infrastructure, the secure sanitized summary message and the token to the user device;
   receiving, by the device and from the user device, the token based on a selection of the secure sanitized summary message by the recipient;
   retrieving, by the device, the notification message from the data structure based on the token; and
   providing, by the device and via a secure virtual private network channel, the notification message to the user device associated with the recipient.

2. The method of claim 1, wherein the user device is configured to display the notification message to the recipient.

3. The method of claim 1, wherein the user device is configured to display the secure sanitized summary message to the recipient and to receive the selection of the secure sanitized summary message by the recipient.

4. The method of claim 1, wherein validating the recipient comprises:
   receiving the entitlement information for the recipient from an identity service; and
   validating that the recipient is entitled to receive the notification message based on the entitlement information.

5. The method of claim 1, wherein generating the secure sanitized summary message, for the notification message, based on the predefined templates comprises:
   analyzing the notification message;
   selecting a predefined template, from a plurality of predefined templates, based on analyzing the notification message; and
   utilizing the predefined template and the notification message to generate the secure sanitized summary message.

6. The method of claim 1, further comprising:
   validating that the secure sanitized summary message does not include the confidential information.

7. The method of claim 1, wherein generating the secure sanitized summary message, for the notification message, based on the natural language processing model comprises:
   processing the notification message, with the natural language processing model, to identify and remove the confidential information from the notification message and to generate the secure sanitized summary message.

8. A device, comprising:
   one or more processors configured to:

receive a notification message comprising confidential information, the notification message to be securely delivered to a recipient associated with a user device;
validate the recipient;
generate a secure sanitized summary message, for the notification message, based on predefined templates or based on a natural language processing model, wherein the secure sanitized summary message omits the confidential information;
generate a token for the notification message;
store the notification message, the token, and entitlement information for the recipient in a data structure;
provide, via an over-the-air (OTA) infrastructure, the secure sanitized summary message and the token to the user device,
wherein the user device is configured to display the secure sanitized summary message to the recipient and to receive a selection of the secure sanitized summary message by the recipient;
receive, from the user device, the token based on the selection of the secure sanitized summary message by the recipient;
retrieve the notification message from the data structure based on the token; and
provide, via a secure virtual private network channel, the notification message to the user device associated with the recipient.

9. The device of claim 8, wherein the one or more processors, to generate the secure sanitized summary message, for the notification message, based on the natural language processing model, are configured to:
process the notification message, with the natural language processing model, to select a predefined template from a plurality of predefined templates and to utilize the predefined template and the notification message to generate the secure sanitized summary message.

10. The device of claim 8, wherein the one or more processors, to generate the token for the notification message, are configured to:
generate the token based on a hash of the notification message, identity data associated with the recipient, and a variable length random byte string.

11. The device of claim 8, wherein the one or more processors, to receive the token based on the selection of the secure sanitized summary message by the recipient, are configured to:
receive the token and credentials of the recipient based on the selection of the secure sanitized summary message by the recipient.

12. The device of claim 11, wherein the one or more processors, to retrieve the notification message from the data structure based on the token, are configured to:
validate that the recipient is entitled to receive the notification message based on the token and the credentials of the recipient; and
retrieve the notification message from the data structure based on validating that the recipient is entitled to receive the notification message.

13. The device of claim 8, wherein the one or more processors are further configured to:
delete the notification message from the data structure after a predetermined time period.

14. The device of claim 8, wherein the one or more processors, to receive the notification message to be securely delivered to the recipient associated with the user device, are configured to:
receive the notification message from a backend system that supports a mobile application provided on the user device.

15. A non-transitory computer-readable medium storing a set of instructions, the set of instructions comprising:
one or more instructions that, when executed by one or more processors of a device, cause the device to:
receive a notification message comprising confidential information, the notification message to be securely delivered to a recipient associated with a user device;
validate the recipient;
generate a secure sanitized summary message, for the notification message, based on predefined templates or based on a natural language processing model, wherein the secure sanitized summary message omits the confidential information;
generate a token for the notification message;
store the notification message, the token, and entitlement information for the recipient in a data structure;
provide, via an over-the-air (OTA) infrastructure, the secure sanitized summary message and the token to the user device;
receive, from the user device, the token based on a selection of the secure sanitized summary message by the recipient;
retrieve the notification message from the data structure based on the token; and
provide, via a secure virtual private network channel, the notification message to the user device associated with the recipient,
wherein the user device is configured to display the notification message to the recipient.

16. The non-transitory computer-readable medium of claim 15, wherein the one or more instructions, that cause the device to validate the recipient, cause the device to:
receive the entitlement information for the recipient from an identity service; and
validate that the recipient is entitled to receive the notification message based on the entitlement information.

17. The non-transitory computer-readable medium of claim 15, wherein the one or more instructions, that cause the device to generate the secure sanitized summary message, for the notification message, based on the predefined templates, cause the device to:
analyze the notification message;
select a predefined template, from a plurality of predefined templates, based on analyzing the notification message; and
utilize the predefined template and the notification message to generate the secure sanitized summary message.

18. The non-transitory computer-readable medium of claim 15, wherein the one or more instructions, that cause the device to generate the secure sanitized summary message, for the notification message, based on the natural language processing model, cause the device to:
process the notification message, with the natural language processing model, to identify and remove the confidential information from the notification message and to generate the secure sanitized summary message.

19. The non-transitory computer-readable medium of claim 15, wherein the one or more instructions, that cause the device to generate the secure sanitized summary message, for the notification message, based on the natural language processing model, cause the device to:
process the notification message, with the natural language processing model, to select a predefined template from a plurality of predefined templates and to utilize the predefined template and the notification message to generate the secure sanitized summary message.

20. The non-transitory computer-readable medium of claim 15, wherein the one or more instructions, that cause the device to generate the token for the notification message, cause the device to:
   generate the token based on a hash of the notification message, identity data associated with the recipient, and a variable length random byte string.

* * * * *